United States Patent
Badenhorst

(10) Patent No.: US 11,551,224 B2
(45) Date of Patent: Jan. 10, 2023

(54) SYSTEMS AND METHODS FOR IDENTIFYING MOBILE DEVICES

(71) Applicant: Visa International Service Association, San Francisco, CA (US)

(72) Inventor: Cornelius Johannes Badenhorst, Cape Town (ZA)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 322 days.

(21) Appl. No.: 15/502,928

(22) PCT Filed: Sep. 18, 2015

(86) PCT No.: PCT/IB2015/057192
§ 371 (c)(1),
(2) Date: Feb. 9, 2017

(87) PCT Pub. No.: WO2016/046711
PCT Pub. Date: Mar. 31, 2016

(65) Prior Publication Data
US 2017/0228732 A1    Aug. 10, 2017

(30) Foreign Application Priority Data
Sep. 26, 2014   (ZA) .................... 2014/07002

(51) Int. Cl.
*G06Q 20/40*    (2012.01)
*G06Q 20/32*    (2012.01)
(Continued)

(52) U.S. Cl.
CPC ..... *G06Q 20/4015* (2020.05); *G06Q 20/3224* (2013.01); *G06Q 20/3278* (2013.01);
(Continued)

(58) Field of Classification Search
CPC .......... G06Q 20/401; G06Q 20/3224; G06Q 20/3278; G06Q 20/40; H04W 12/00503
See application file for complete search history.

(56) References Cited

U.S. PATENT DOCUMENTS 8,863,243 B1* 10/2014 Lidzborski ............ H04L 63/102
726/4
2005/0071671 A1* 3/2005 Karaoguz ............ G06Q 20/322
705/77
(Continued)

FOREIGN PATENT DOCUMENTS

RU    2263347    10/2005
RU    2439703    1/2012
(Continued)

OTHER PUBLICATIONS

Linoff, Gordon S. and Michael Berry. "Taking a Random Sample on Amazon Redshift," Data Miners Blog. (Feb. 26, 2014).*
(Continued)

*Primary Examiner* — Elizabeth H Rosen
(74) *Attorney, Agent, or Firm* — Kilpatrick Townsend & Stockton LLP

(57) ABSTRACT

The disclosure provides systems and methods for identifying a mobile device when requesting a secure transaction. In a method conducted at a transaction server access to stored location data having been periodically received relating to a mobile device and stored with an identifier of the mobile device is provided. Historical location data having been stored locally at a mobile device is received from the mobile device when requesting a secure transaction. The historical location data received from the mobile device is matched to a subset of the stored location data to obtain or verify an identifier of the mobile device requesting the secure transaction. The mobile device requesting the secure transaction
(Continued)

is associated with the identifier so as to identify or verify the identity of the mobile device requesting the secure transaction.

5 Claims, 8 Drawing Sheets

(51) Int. Cl.
  *H04W 12/30* (2021.01)
  *H04W 12/63* (2021.01)
(52) U.S. Cl.
  CPC ............ *G06Q 20/40* (2013.01); *H04W 12/30* (2021.01); *H04W 12/63* (2021.01)

(56) References Cited

U.S. PATENT DOCUMENTS

| | | | |
|---|---|---|---|
| 2010/0024017 A1* | 1/2010 | Ashfield | G06F 21/35 726/7 |
| 2011/0143711 A1* | 6/2011 | Hirson | H04L 63/18 455/410 |
| 2012/0191614 A1* | 7/2012 | Babitch | G06Q 30/06 705/44 |
| 2012/0203697 A1 | 8/2012 | Morgan et al. | |
| 2012/0221475 A1 | 8/2012 | Grigg | |
| 2013/0023240 A1 | 1/2013 | Weiner | |
| 2013/0290119 A1* | 10/2013 | Howe | G06Q 20/4015 705/16 |
| 2014/0214670 A1 | 7/2014 | McKenna | |

FOREIGN PATENT DOCUMENTS

| | | |
|---|---|---|
| RU | 2468433 | 11/2012 |
| WO | 2013181151 A2 | 12/2013 |

OTHER PUBLICATIONS

Linoff, Gordon S. and Michael Berry. "Taking a Random Sample on Amazon Redshift," Data Miners Blog. (Feb. 26, 2014). (Year: 2014).*
Zhang, Feng, Aron Kondoro, and Sead Muftic. "Location-Based Authentication and Authorization Using Smart Phones," 2012 IEEE 11th International Conference on Trust, Security and Privacy in Computing and Communications, (2012), pp. 1285-1292. (Year: 2012).*
Supplementary European Search Report, dated Mar. 14, 2018, in European Paient Application No. 15844362.2, 8 pages.
International Search Report / Written Opinion, dated Jul. 28, 2016, in PCT Application No. PCT/IB2015/057192, 10 pages.
RU2017114339 , "Office Action", including English Translation. dated Apr. 22, 2019, 15 pages.

* cited by examiner

| Location data point | Time | MSISDN |
|---|---|---|
| 33°53'14.6"S 18°30'42.9"E | 03/03/2013 13:06 | +270123456789 |
| 33°53'14.8"S 18°30'42.8"E | 03/03/2013 13:07 | +270123456789 |
| 33°53'14.9"S 18°30'42.7"E | 03/03/2013 13:08 | +270123456789 |
| 33°53'15.0"S 18°30'42.6"E | 03/03/2013 13:09 | +270123456789 |
| 33°53'15.1"S 18°30'42.7"E | 03/03/2013 13:10 | +270123456789 |
| 33°53'15.2"S 18°30'42.6"E | 03/03/2013 13:11 | +270123456789 |
| 33°53'15.3"S 18°30'42.5"E | 03/03/2013 13:13 | +270123456789 |
| 33°53'15.4"S 18°30'42.6"E | 03/03/2013 13:14 | +270123456789 |
| 33°53'15.5"S 18°30'42.7"E | 03/03/2013 13:15 | +270123456789 |
| 33°53'15.6"S 18°30'42.8"E | 03/03/2013 13:16 | +270123456789 |
| 33°53'15.5"S 18°30'42.9"E | 03/03/2013 13:17 | +270123456789 |

SYSTEMS AND METHODS FOR IDENTIFYING MOBILE DEVICES

CROSS REFERENCE TO RELATED APPLICATIONS

This application claims priority to South African provisional patent application number 2014/07002, filed on 26 Sep. 2014, which is incorporated by reference herein.

FIELD OF THE INVENTION

This invention relates to the identification or the verification of the identity of mobile devices and, in particular, to the identification or verification of the identity of mobile devices when interacting with a transaction server.

BACKGROUND TO THE INVENTION

Use of mobile devices is very widespread and security of information stored on or accessed by a mobile device is an important issue.

Many mobile devices include secure elements, for example in the form of a hardware security module, built into the mobile device or attachable to the mobile device, such as via the subscriber identity module (SIM) card. The secure element may store secure details such as payment card details and may control the security and access to the payment card details, for example, for use with Near Field Communication (NFC) payment implementations.

Mobile devices may communicate with a remote server in carrying out secure transactions instead of using a device-based secure element. An example of this is host card emulation (HCE) where, instead of the mobile device using a secure element on the mobile device to store payment card details, the payment card details are stored in a cloud-based secure server. An application on the mobile device then makes a request to the cloud-based secure server for card details to be presented to a point of sale device.

In order to avoid hacking of the payment process, the mobile device must identify itself securely to the cloud-based secure server to ensure that the request for payment card details is valid. In order to not negatively impact the user experience, this may be aimed to be done without user input.

Device fingerprinting technology is a known method of identifying a mobile device to a remote server. Active fingerprinting uses the installation of executable code directly on a device which has access to identifiers assigned to the device hardware, such as the International Mobile Station Equipment Identity (IMEI) or the media access control (MAC) address. The executable code uses an algorithm, with inputs of an identifier to generate the fingerprint. The remote server knows how the fingerprint is generated by the device and can therefore identify the device.

Fingerprinting technology may result in breaches of security as a hacker may be able to obtain the executable code and reverse engineer it and may try to access a remote server storing card credentials by imitating the mobile device.

There is a need in the art to address the aforementioned and other problems.

SUMMARY OF THE INVENTION

In accordance with a first aspect of the invention, there is provided a method for identifying a mobile device when requesting a secure transaction, the method conducted at a transaction server comprising the steps of: providing access to stored location data having been periodically received relating to a mobile device and stored with an identifier of the mobile device; receiving, from the mobile device when requesting a secure transaction, historical location data having been stored locally at the mobile device; matching the historical location data received from the mobile device to a subset of the stored location data to obtain or verify an identifier of the mobile device requesting the secure transaction; and, associating the mobile device requesting the secure transaction with the identifier so as to identify or verify the identity of the mobile device requesting the secure transaction.

Further features provide for the step of providing access to stored location data having been periodically received relating to a mobile device to include periodically receiving, at the transaction server, location data relating to the mobile device together with an identifier of the mobile device and storing the location data with the identifier; for the location data to be received together with the identifier from the mobile device; or alternatively, for the location data to be received together with the identifier from a remote location data store.

A still further feature provides for the step of providing access to stored location data having been periodically received relating to a mobile device to include accessing a remote location data store at which location data relating to the mobile device is stored with an identifier of the mobile device.

A yet further feature provides for the step of matching the historical location data received from the mobile device to a subset of the stored location data to obtain or verify an identifier of the mobile device to include searching stored location data accessible to the transaction server for a subset of the stored location data which matches the received historical location data; and obtaining or verifying an identifier stored with the matching stored location data.

Even further features provide for the historical and stored location data to timestamped and for the step of matching the historical location data received from the mobile device to a subset of the stored location data to obtain or verify an identifier of the mobile device to include searching stored location data accessible to the transaction server for a subset of the stored location data having corresponding timestamps.

A further feature provides for the step of matching the historical location data received from the mobile device to a subset of the stored location data to obtain or verify an identifier of the mobile device to include transmitting the received historical location data to a remote location data store for searching location data stored thereat for a subset of the stored location data which matches the historical location data; and receiving, from the remote location data store, an identifier stored with the matching stored location data.

Still further features provide for the historical location data received from the mobile device requesting the secure transaction to be received together with an identifier of the mobile device, and for the step of matching the historical location data received from the mobile device to a subset of the stored location data to verify an identifier of the mobile device requesting the secure transaction to include: searching stored location data accessible to the transaction server for a subset of the stored location data which matches the received historical location data; obtaining an identifier that is stored with the matching stored location data; and, validating the received identifier against the obtained identifier.

Yet further features provide for the step of searching stored location data accessible to the transaction server for a subset of the stored location data which matches the received historical location data to include using an algorithm to determine one or more location data windows to search; and for the algorithm to correspond with an algorithm executing at the mobile device requesting the secure transaction to select one or more windows of historical location data stored locally at the mobile device for transmission therefrom.

In accordance with a second aspect of the invention, there is provided a method for identifying a mobile device when requesting a secure transaction, the method conducted at a mobile device comprising the steps of: storing, locally at the mobile device, location data relating to the mobile device; periodically transmitting the location data together with an identifier of the mobile device to a transaction server or a remote location data store for storage thereat; and, when requesting a secure transaction, transmitting historical location data having been stored locally at the mobile device to the transaction server for use by the transaction server in identifying or verifying the identity of the mobile device requesting the secure transaction.

A further feature provides for the step of storing, locally at the mobile device, location data relating to the mobile device to store one or more sets of location data such that the historical location data stored locally at the mobile device forms a subset of the location data stored at the transaction server or remote location data store.

A still further feature provides for the location data to include one or more of the group of: distinct data points, routes followed, locations visited over one or more windows, locations most frequently visited, the number of times one or more locations have been visited, locations at which above a threshold amount of time was spent or a combination or variation of these.

A yet further feature provides for the step of transmitting historical location data having been stored locally at the mobile device to include obtaining a window of historical location data stored locally at the mobile device and transmitting the window of historical location data to the transaction server.

Further features provide for transmitting historical location data having been stored locally at the mobile device to include using an algorithm executing at the mobile device to select one or more windows of the historical location data stored locally at the mobile device for transmission to the transaction server, and for the algorithm to correspond with an algorithm executing at the transaction server to determine one or more location data windows to search.

A still further feature provides for transmitting historical location data having been stored locally at the mobile device to include randomly selecting one or more windows of the historical location data stored locally at the mobile device for transmission to the transaction server.

In accordance with a third aspect of the invention, there is provided a system for identifying a mobile device when requesting a secure transaction, the system including a transaction server comprising: a stored location data accessing component for providing access to stored location data having been periodically received relating to a mobile device and stored with an identifier of the mobile device; a historical location data receiving component for receiving, from the mobile device when requesting a secure transaction, historical location data having been stored locally at the mobile device; a matching component for matching the historical location data received from the mobile device to a subset of the stored location data to obtain or verify an identifier of the mobile device requesting the secure transaction; and, an associating component for associating the mobile device requesting the secure transaction with the identifier so as to identify or verify the identity of the mobile device requesting the secure transaction.

Further features provide for the stored location data accessing component to include a receiving component for periodically receiving, at the transaction server, location data relating to the mobile device together with an identifier of the mobile device and a storing component for storing the received location data with the identifier; for the location data to be received together with the identifier from the mobile device; or alternatively, for the location data to be received together with the identifier from a remote location data store.

A still further feature provides for the stored location data accessing component to access a remote location data store at which location data relating to the mobile device is stored with an identifier of the mobile device.

A yet further feature provides for the matching component to include a searching component for searching stored location data accessible to the transaction server for a subset of the stored location data which matches the received historical location data and an identifier component for obtaining or verifying an identifier stored with the matching stored location data.

Even further features provide for the historical and stored location data to be timestamped and for the searching component to search stored location data accessible to the transaction server for a subset of the stored location data having corresponding timestamps.

A further feature provides for the matching component to include: a transmitting component for transmitting the received historical location data to a remote location data store for searching location data stored thereat for a subset of the stored location data which matches the historical location data; and, an identifier receiving component for receiving, from the remote location data store, an identifier stored with the matching stored location data.

Still further features provide for the historical location data receiving component to receive historical location data from the mobile device together with an identifier of the mobile device, and for the matching component to include: a searching component for searching stored location data accessible to the transaction server for a subset of the stored location data which matches the received historical location data; an identifier component for obtaining an identifier that is stored with the matching stored location data; and, a validating component for validating the received identifier against the obtained identifier.

Yet further features provide for the searching component to use an algorithm to determine one or more location data windows to search; and for the algorithm to correspond with an algorithm executing at the mobile device requesting the secure transaction to select one or more windows of historical location data stored locally at the mobile device for transmission therefrom.

In accordance with a fourth aspect of the invention, there is provided a system for identifying a mobile device when requesting a secure transaction, the system including a mobile device comprising: a location data storing component for storing, locally at the mobile device, location data relating to the mobile device; an updating component for periodically transmitting the location data together with an identifier of the mobile device to a transaction server or a remote location data store for storage thereat; and, a historical location data transmitting component for, when requesting a secure transaction, transmitting historical location data having been stored locally at the mobile device to the transaction server for use by the transaction server in identifying or verifying the identity of the mobile device requesting the secure transaction.

A further feature provides for the location data storing component to store one or more sets of location data such that the historical location data stored locally at the mobile device forms a subset of the location data stored at the transaction server or remote location data store.

A still further feature provides for the location data to include one or more of the group of: distinct data points, routes followed, locations visited over one or more windows, locations most frequently visited, the number of times one or more locations have been visited, locations at which above a threshold amount of time was spent or a combination or variation of these.

A yet further feature provides for the historical location data transmitting component to obtain a window of historical location data stored locally at the mobile device and transmit the window of historical location data to the transaction server.

Even further features provide for the historical location data transmitting component to use an algorithm executing at the mobile device to select one or more windows of the historical location data stored locally at the mobile device for transmission to the transaction server, and for the algorithm to correspond with an algorithm executing at the transaction server to determine one or more location data windows to search.

A further feature provides for the historical location data transmitting component randomly to select one or more windows of the historical location data stored locally at the mobile device for transmission to the transaction server.

In accordance with a fifth aspect of the invention, there is provided a computer program product for identifying a mobile device when requesting a secure transaction, the computer program product comprising a computer-readable medium having stored computer-readable program code for performing the steps of: providing access to stored location data having been periodically received relating to a mobile device and stored with an identifier of the mobile device; receiving, from the mobile device when requesting a secure transaction, historical location data having been stored locally at the mobile device; matching the historical location data received from the mobile device to a subset of the stored location data to obtain or verify an identifier of the mobile device requesting the secure transaction; and, associating the mobile device requesting the secure transaction with the identifier so as to identify or verify the identity of the mobile device requesting the secure transaction.

In accordance with a sixth aspect of the invention, there is provided a computer program product for identifying a mobile device when requesting a secure transaction, the computer program product comprising a computer-readable medium having stored computer-readable program code for performing the steps of: storing, locally at a mobile device, location data relating to the mobile device; periodically transmitting the location data together with an identifier of the mobile device to a transaction server or a remote location data store for storage thereat; and, when requesting a secure transaction, transmitting historical location data having been stored locally at the mobile device to the transaction server for use by the transaction server in identifying or verifying the identity of the mobile device requesting the secure transaction.

Further features provide for the computer-readable program code to be non-transitory and for the computer-readable program code to be executable by a processing circuit.

The invention will now be described, by way of example only, with reference to the accompanying drawings.

BRIEF DESCRIPTION OF THE DRAWINGS

The systems and methods described herein enable device identification. Historical location data stored locally at a mobile device is used to identify the mobile device to a transaction server when the mobile device requests a secure transaction. The transaction server provides access to stored location data having been periodically received relating to a mobile device and stored with an identifier of the mobile device. The transaction server receives historical location data having been stored locally at the mobile device from the mobile device when it requests a secure transaction. The transaction server matches the received historical location data to a subset of the stored location data to obtain or verify an identifier of the mobile device requesting the secure transaction and associates the mobile device requesting the secure transaction with the identifier so as to identify or verify the identity of the mobile device.

Various exemplary embodiments are described below with reference to the accompanying Figures.

Figure 1:
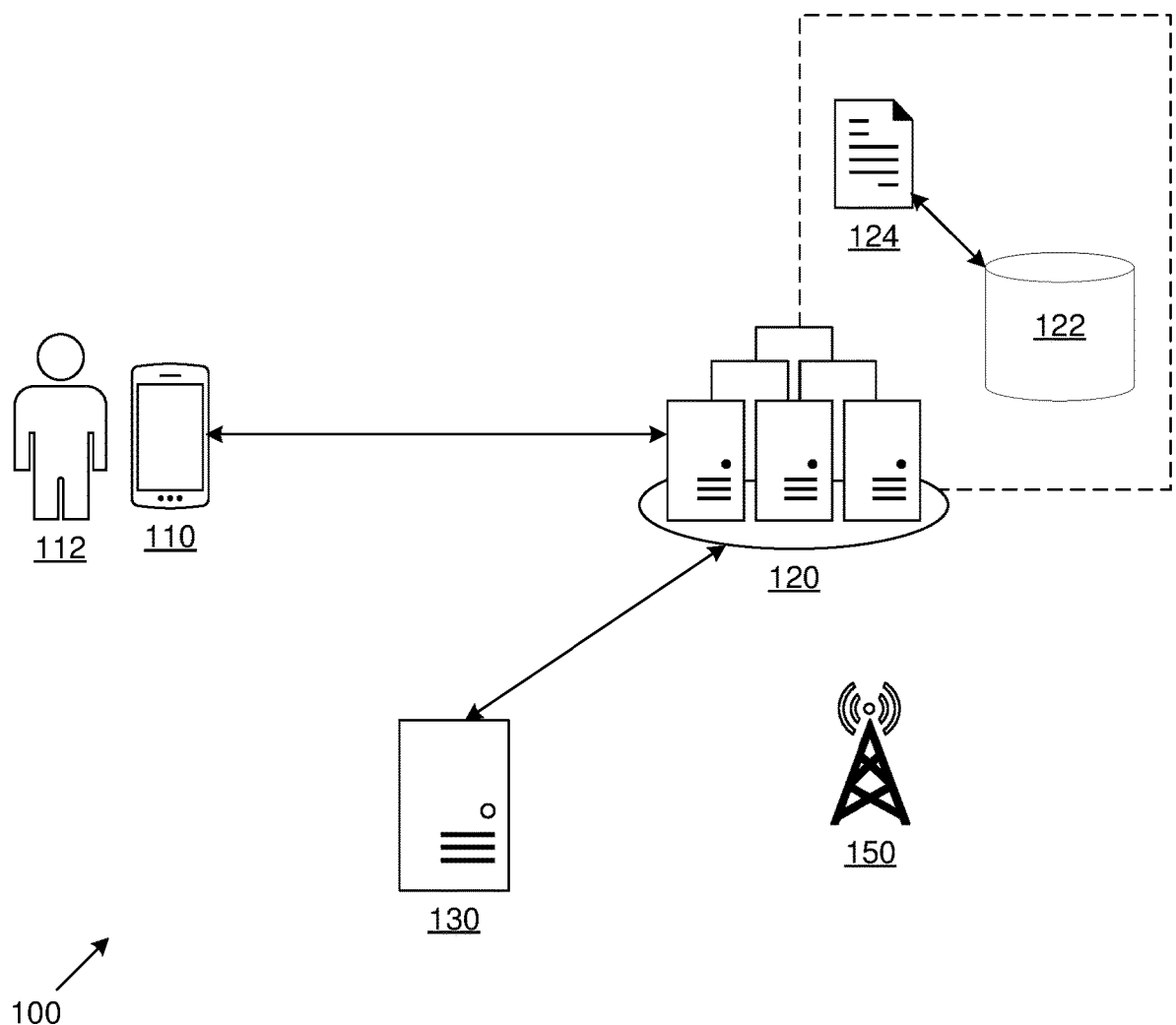
FIG. 1 is a block diagram which illustrates a system for identifying or verifying the identity of a mobile device in which aspects of the disclosure may be implemented.

An exemplary system (100) in which aspects of the disclosure may be implemented is illustrated in FIG. 1. The system (100) includes a mobile device (110) and a transaction server (120). The system (100) may further include a remote location data store (130) which may be a mobile network operator server maintained or operated by a mobile network operator (MNO) or a server maintained by a location data service provider. It should be appreciated that while only one of each device, user, remote location data store, etc. is shown, in an implementation there may be a plurality of each of these.

The mobile device (110) may be any appropriate mobile communications device. Exemplary mobile communications devices include: mobile telephones such as smart phones, feature phones and basic cell phones; tablet computers; personal digital assistants; wearable computing devices; consumer portable payment devices; laptop computers and the like. The mobile device (110) may include a processor, a memory and a non-transitory computer readable medium comprising code executable by the processor to perform functions, such as generating messages, electronically receiving and transmitting messages or data, and the like.

The mobile device (110) may be capable of communicating with the transaction server (120) over a communication network (150), such as the Internet. This may enable a user (112) of the mobile device (110) to transmit requests, messages and/or data to and receive requests, notifications, messages and/or data from the transaction server (120). In some embodiments, the mobile device is capable of communicating over a mobile communication network such as a Global System for Mobile Communications (GSM) or Universal Mobile Telecommunications System (UMTS) communication network.

The mobile device (110) may have an identifier associated therewith. The identifier may be capable of identifying the mobile device (110) to external systems, such as the transaction server (120). The identifier may be in the form of a user-configurable identifier (which may be a username or email address, for example); an application specific identifier provided by a software application resident on the mobile device; a hardware identifier or the like. The identifier may for example include a Media Access Control (MAC) address; a Unique Device Identifier (UDID), for example in the case of an Apple® device; an ANDROID_ID or Google® Service Framework ID (GSF ID) key, for example, in the case of an Android™ device; a network identifier; and any combination or variation of these. Exemplary network identifiers include: a Mobile Station Integrated Services Digital Network (MSISDN) identifier (e.g. a phone number); an integrated circuit card identifier (ICCID); an International Mobile Subscriber Identity (IMSI); an International Mobile Station Equipment Identity (IMEI) or the like.

It should be appreciated that some or all of the identifiers mentioned above may be susceptible to compromise. For example, some of the identifiers (such as an MSISDN) may be known to other parties and therefore it may be undesirable to rely solely on such an identifier for the purpose of identifying the mobile device to the transaction server when requesting a secure transaction.

The mobile device (110) has the capability of determining its geographical location and stores location data relating to its geographical location locally at the mobile device. The mobile device (110) may, for example, periodically establish or ascertain its geographical location and store the related location data to build up a record of historical location data. Additionally, the mobile device (110) may also periodically transmit the location data together with the identifier to the transaction server (120) and/or the remote location data store (130) for storage thereat.

The mobile device (110) is configured to initiate or authorize secure transactions. The mobile device (110) may be configured to generate a secure transaction request and to include historical location data stored at the mobile device in the secure transaction request. The mobile device may further be configured to transmit the secure transaction request including historical location data to the transaction server (120). A secure transaction request may be a request for payment credentials usable in conducting a financial transaction. However, it is anticipated that the secure transaction request may relate to any interaction or initiation thereof between the mobile device (110) and the transaction server (120). For example, in other embodiments, a secure transaction may include accessing a secure website, secure server or other resource, or establishing a virtual private network (VPN). In some cases, as will be explained further below, the historical location data may be sent to the transaction server (120) together with the identifier to enable the transaction server (120) to verify or validate the identifier transmitted by the mobile device (110) or to serve as additional identifying data.

The transaction server (120) may be any appropriate server computer, distributed server computer, cloud-based server computer, mainframe computer, server computer cluster or the like. The transaction server (120) may include a processor, a memory and a non-transitory computer readable medium comprising code executable by the processor to perform functions, such as generating messages, electronically receiving and transmitting messages or data, parsing messages or data, and the like. In some embodiments, as will be described in greater detail below, the transaction server (120) may include a location data store in which location data relating to the mobile device (110) may be stored, while in other embodiments, the transaction server (120) may access a remote location data store (130) in which location data relating to the mobile device (110) may be stored.

The transaction server (120) has access to a database (122), which may be local to or remote from the transaction server (120), and in which a data record (124) may be stored. The data record (124) may include one or more data elements of the group of: the identifier; information identifying the user (112) such as personal information of the user, authentication information such as a user name and password (or hash thereof), biometric information or the like; payment credentials of the user (112) and the like.

The data record (124) may also include data relating to an algorithm which may execute at the transaction server (120) to determine one or more windows or discrete points or subsets of stored location data to search. The algorithm corresponds to an algorithm executing at the mobile device (110). The algorithm or elements thereof may be unique to the user (112). For example, in some cases, the algorithm may implement a pseudo-random number generator which is used to select windows of data or discrete data points. A seed value of the random number generator may be stored in association with the data record (124). By storing the same seed value at the mobile device (110), the same windows of data or discrete data points may be selected for transmission thereat. In some cases the seed value may be incremented at the mobile device (110) and the transaction server (120) each time a secure transaction is requested.

The payment credentials stored with the data record (124) may be cloud-based payment credentials associated with a host card emulation (HCE) system. HCE enables mobile applications running on supported operating systems with the ability to offer payment card and access card solutions independently of third parties while leveraging cryptographic processes traditionally used by hardware-based secure elements without the need for a physical secure element. This technology enables merchants to offer payment cards solutions more easily through mobile closed-loop contactless payment solutions, offers real-time distribution of payment cards and, more tactically, allows for an easy deployment scenario that does not require changes to the software inside payment terminals.

Some embodiments provide for the transaction server (120) to periodically receive location data updates relating to the geographical location of the mobile device (110) together with the identifier of the mobile device. The transaction server (120) may store the received location data together with the identifier, for example, in association with the data record (124). In this manner, the transaction server (120) maintains a record of stored location data relating to the mobile device (110). The record of stored location data is built up over time as the mobile device continues to transmit location data updates together with the identifier. The location data may be received from the mobile device (110) or the remote location data store (130). The stored location data is accessible to the transaction server (120) and usable in obtaining or verifying the identifier of the mobile device (110) when requesting a secure transaction.

In another embodiment, the transaction server (120) may have access to a remote location data store (130) maintained or operated by a third-party location data service provider or a MNO. The remote location data store (130), which is discussed in greater detail below, may have stored location data relating to the mobile device (110) which is stored together with the identifier.

The remote location data store (130) may be maintained or operated by a MNO or a location data service provider and may be any appropriate server computer, distributed server computer, cloud-based server computer, mainframe computer, server computer cluster or the like. The remote location data store (130) may include a processor, memory and a non-transitory computer readable medium comprising code executable by the processor to perform functions, such as generating messages, electronically receiving and transmitting messages or data, parsing messages or data, and the like.

Exemplary location data service providers include the Google Latitude™ location service or the Google Maps™ mapping service. A location data service provider typically receives location data from a mobile device and stores the location data in a data store in association with an identifier of the mobile device (110). In an embodiment where the remote location data store (130) is maintained or operated by a location data service provider, the remote location data store (130) periodically receives location data updates from the mobile device (110) together with the identifier. The remote location data store (130) stores the received location data together with the identifier to maintain stored location data relating to the mobile device which is updated over time. This location data relating to the mobile device and stored at the remote location data store (130) with an identifier of the mobile device may be accessible to the transaction server (120).

A MNO may provide a mobile communication network which may include a number of base stations (e.g. cell towers) which provide wireless communication between the mobile device (110) and the broader communication network. In an embodiment in which the remote location data store (130) is maintained or operated by a MNO, the remote location data store (130) may be operable to determine the location of the mobile device (110) by triangulating signals from the mobile device (110) received by the cell towers. The remote location data store (130) may store such location data in a database in association with the identifier (e.g. a network identifier) of the mobile device (110). This location data relating to the mobile device and stored at the remote location data store (130) with an identifier of the mobile device may be accessible to the transaction server (120).

Embodiments described herein anticipate three scenarios by way of which stored location data stored at the location data store (130) may be accessible to the transaction server. In a first scenario, the remote location data store (130) may periodically transmit the location data together with the identifier to the transaction server (120) for storage thereat. In a second scenario, the remote location data store (130) may be operable to receive historical location data from the transaction server (120) and search the stored location data for a subset of the stored location data which matches the received historical location data and obtain or verify the identifier of the mobile device requesting the secure transaction. The remote location data store (130) may then transmit the identifier to the transaction server (120). In a third scenario, the transaction server may remotely access the stored location data stored at the remote location data store (130) via the communication network and may perform searching and matching operations on the accessible stored location data.

The transaction server (120) may also be configured to receive historical location data from the mobile device (110) when requesting a secure transaction. The transaction server (120) may be configured to match the historical location data, received from the mobile device when requesting the secure transaction, to a subset of stored location data to obtain or verify an identifier of the mobile device.

For example, the transaction server (120) may search the stored location data accessible to the transaction server (120) for a subset of the stored location data which matches the received location data and obtain the identifier stored with the matching location data. By identifying stored location data which matches the received historical location data, the transaction server (120) may identify, for example using the identifier stored with the matching location data, the data record (124) associated with the identifier and the mobile device (110).

Embodiments described herein also anticipate that the historical location data received at the transaction server (120) from the mobile device (110) may be received together with the identifier of the mobile device, in which case the transaction server (120) is operable to verify or validate the received identifier against an identifier stored with matching stored location data.

The transaction server (120) may also be configured to process the secure transaction request against the data record (124).

Figure 2:
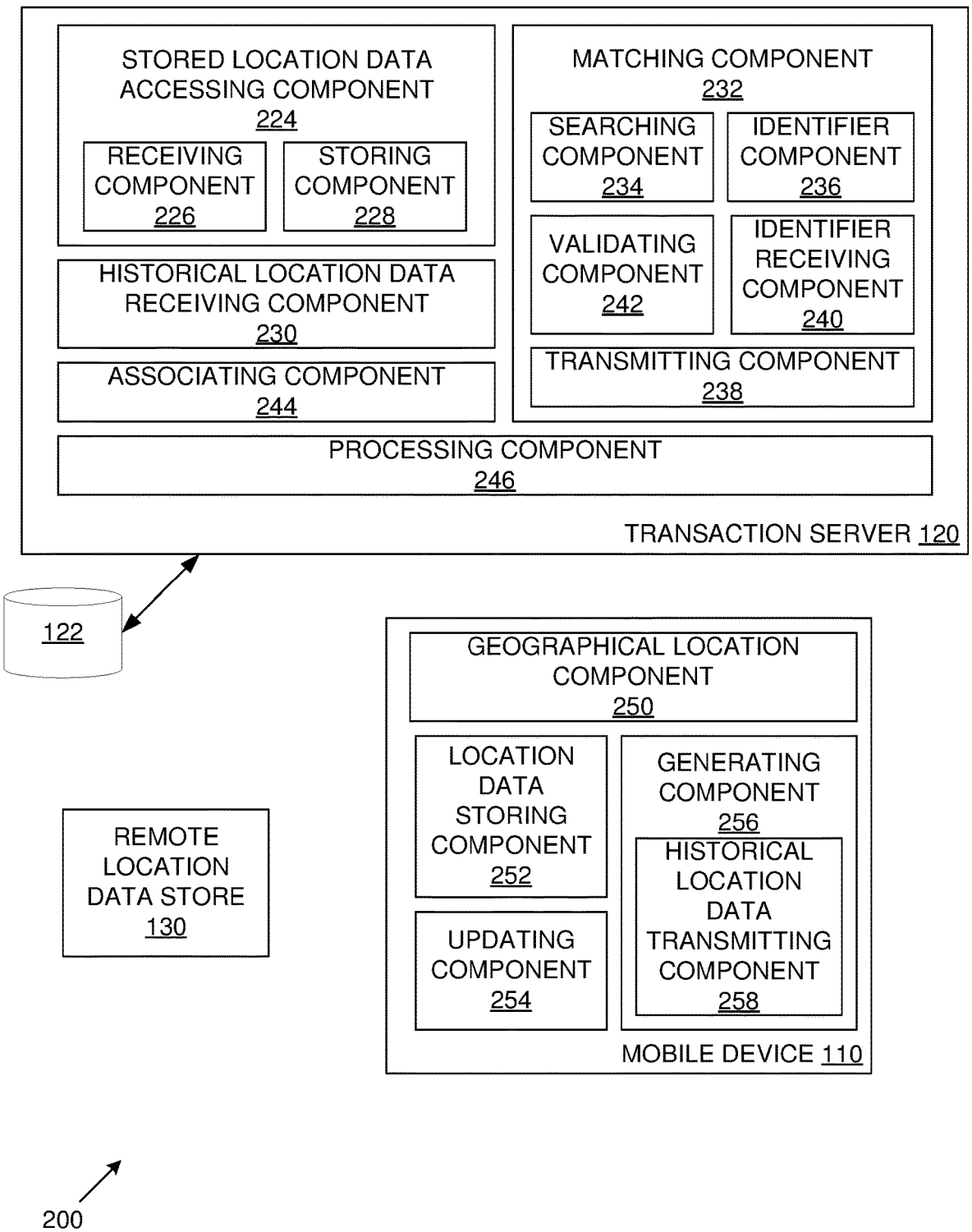
FIG. 2 is a block diagram which illustrates components of a system for identifying or verifying the identity of a mobile device when requesting a secure transaction.

FIG. 2 is a block diagram which illustrates components of the exemplary system (100) illustrated in FIG. 1.

The transaction server (120) includes a stored location data accessing component (224) for providing access to stored location data having been periodically received relating to the mobile device (110) and stored with an identifier of the mobile device.

In one embodiment, the stored location data accessing component (224) provides access to location data stored at the transaction server (120). The stored location data accessing component (224) includes a receiving component (226) for periodically receiving, at the transaction server (120), location data relating to the mobile device together with an identifier of the mobile device. The location data may be received together with the identifier from the remote location data store (130) or from the mobile device (110). The stored location data accessing component (224) also includes a storing component (228) for storing the received location data with the identifier. The storing component (228) may store the location data together with the identifier in a data record associated with the mobile device (110).

In another embodiment, the stored location data accessing component (224) accesses the remote location data store (130) at which location data relating to the mobile device is stored with an identifier of the mobile device.

The transaction server (120) includes a historical location data receiving component (230) for receiving, from the mobile device (110) when requesting a secure transaction, historical location data having been stored locally at the mobile device (110). The historical location data may be included in a secure transaction request transmitted from the mobile device (110) and is useable by the transaction server (120) to identify, or verify the identity of, the mobile device requesting the secure transaction.

The transaction server (120) further includes a matching component (232) for matching the historical location data received from the mobile device to a subset of the stored location data to obtain or verify an identifier of the mobile device (110) requesting the secure transaction. Because the historical location data and the stored location data relate to the location of the same device, the received historical and one or more subsets of the stored location data should correspond to a relatively high degree of accuracy and are thus usable as a device identifier, or 'fingerprint' to uniquely identify the device.

The matching component (232) may include a searching component (234) for searching stored location data accessible to the transaction server (120) for a subset of the stored location data which matches the received historical location data. The searching component (234) may search stored location data stored at the transaction server or alternatively may search the remote location data store (130) for subsets of location data stored thereat which match the received historical location data.

For example, in one embodiment, the location data includes discrete location points, such as GPS coordinates, in which case the matching component (232) may query the database (122) for data records having matching discrete location data points. In order to add further uniqueness to the location data, the geographical location data may be timestamped, or may include patterns or routes travelled such that there is an extremely high probability that only one data record will have location data associated therewith which matches the received location data.

The matching component (232) may also include an identifier component (236) for obtaining or verifying an identifier stored with the matching stored location data.

The searching component (234) may use an algorithm to determine one or more location data windows to search. The algorithm used may correspond with an algorithm executing at the mobile device (110) requesting the secure transaction. The algorithm may, for example, select a particular pattern of location data which should be transmitted from the mobile device and which should be used in the matching operation. In some cases, the algorithm may be dynamic meaning that for each transaction request, the mobile device selects a slightly different pattern. The algorithm executing at the transaction server (120) may be synchronised such that the searching component (234) implements the correct pattern at the appropriate time. In this manner, a random 'fingerprint', based on the location history of the mobile device, may be generated by the mobile device each time mobile device wishes to request a secure transaction.

As mentioned previously, it is also anticipated that the location data may be timestamped. This may include the historical location data and the stored location data and may relate to the time at which the mobile device was at the associated location. In such a case, the searching component (234) searches stored location data accessible to the transaction server (120) for a subset of the stored location data having corresponding timestamps. This may reduce the amount of location data which the transaction server has to search through.

In another embodiment, the matching component (232) may include a transmitting component (238) for transmitting the received historical location data to the remote location data store (130) for searching location data stored thereat for a subset of the stored location data which matches the historical location data. In this manner, searching for matching stored location data may be outsourced to the remote location data store (130). The matching component (232) would then also include an identifier receiving component (240) for receiving an identifier stored with the matching stored location data from the remote location data store (130).

Some embodiments further anticipate that the historical location data receiving component (230) may receive historical location data from the mobile device (110) together with an identifier of the mobile device. In this implementation, the transaction server (120) may be operable to verify the identifier of the mobile device (110). In such an embodiment, the matching component (232) further includes, in addition to the searching component (234) and the identifier component (236), a validating component (242) for validating the received identifier against the obtained identifier. The validating component (242) may for example ensure that the identifier received together with the historical location data from the mobile device requesting the secure transaction matches the obtained identifier stored with the matching location data. If the received identifier is not validated, the secure transaction may be prevented from being processed or the mobile device may be flagged as being unidentified or as having an unknown identity.

The transaction server (120) further includes an associating component (244) for associating the mobile device (110) requesting the secure transaction with the identifier so as to identify or verify the identity of the mobile device requesting the secure transaction. The associating component (244) may for example associate the mobile device with the relevant data record to enable the mobile device to conduct the requested secure transaction against or using information stored in the data record.

In some cases, the associating component (244) may, for example, responsive to the matching component (232) obtaining or verifying the identifier of the mobile device requesting the secure transaction, flag the mobile device as being identified and associated with the data record and may temporarily permit the mobile device to access other data associated with the data record or otherwise permit further interaction with the mobile device. The associating component (244) may assign a temporary interaction identifier to the mobile device to permit further, but temporary, interaction between the mobile device (110) and the transaction server (120). It is also anticipated the associating component (244) may transmit an authentication request to the mobile device, requiring the user to authenticate him- or herself with the transaction server (120) prior to permitting further interaction with the transaction server (120).

Some embodiments further provide for the transaction server (120) to include a processing component (246) for processing the secure transaction request against the data record. The processing component (246) may use data elements, such as payment credentials, stored in association with the data record in processing the secure transaction request.

The mobile device (110) includes a geographical location component (250) for determining the geographical location of the mobile device (110). The geographical location component (250) may include one or more of a GPS receiver, a Wi-Fi location determining component, an inertial navigation determining component, a Bluetooth™ Low Energy (BLE) location determining component or cell-tower location determining component to enable the mobile device to determine the geographical location of the mobile device. The geographical location component (250) outputs location data relating to the location of the mobile device.

The location data may include geographical location data points, such as global positioning system (GPS), or similar, coordinates. Embodiments also anticipate the location data being cell tower location data, for example data received at the mobile device from nearby mobile communication network cell towers. The cell tower location data may be usable by the transaction server to approximate a geographical location of the mobile device using, for example, crowd sourcing. Similarly, the location data may include Wi-Fi location data. The Wi-Fi location data may data received at the mobile device from nearby Wi-Fi networks and may be usable by the transaction server to approximate a geographical location of the mobile device (e.g. using crowd sourcing). The location data may further include BLE location data; inertial navigation system location data and the like.

The location data may be in the form of one or more of distinct location data points (such as specific GPS coordinates relating to the location of the mobile device); routes followed by the mobile device; locations visited over one or more windows; locations most frequently visited; the number of times one or more locations have been visited; and locations at which the mobile device has spent above a threshold amount of time (for example over 1 hour, 2 hours, overnight or the like). The mobile device may, for example, be configured to determine, based on its location data, whether the mobile device is at a user's home, at the user's place of work, or other locations the user frequents and such locations may be included in the location data. In some cases, the location data may be timestamped. It should also be appreciated that one or more variations or combinations of these may be used.

The location data is said to be historical location data in that it includes location data that has been built up over a period of time, which may be a day, a week, a month, six months, a year or the like. Historical location data, or at least a large enough subset thereof, associated with a mobile device will be unique to that mobile device meaning that the historical location data can be used to uniquely identify the device.

The mobile device (110) further includes a location data storing component (252) for storing, locally at the mobile device, location data relating to the mobile device and an updating component (254) for periodically transmitting the location data together with an identifier of the mobile device to a transaction server (120) or a remote location data store (130) for storage thereat. The location data storing component (252) may store one or more sets of location data such that the historical location data stored locally at the mobile device forms a subset of location data which is stored at the transaction server or remote location data store.

The mobile device (110) may also include a generating component (256) for generating a secure transaction request. The generating component (256) may include a historical location data transmitting component (258) for, when requesting a secure transaction, transmitting historical location data having been stored locally at the mobile device to the transaction server (120) for use by the transaction server (120) in identifying or verifying the identity of the mobile device. In some embodiment, the historical location data may be included in the secure transaction request.

The historical location data transmitting component (258) may obtain a window or other form of subset of historical location data stored locally at the mobile device for transmission to the transaction server (120). In some embodiments, the historical location data transmitting component (258) uses an algorithm executing at the mobile device (110) to select one or more windows of the historical location data stored locally at the mobile device for transmission to the transaction server (120). As mentioned above, the algorithm may correspond with an algorithm executing at the transaction server (120) to determine one or more location data windows to search. In other cases, the historical location data transmitting component (258) may randomly select one or more windows of the historical location data stored locally at the mobile device for transmission to the transaction server (120).

Figure 3A:
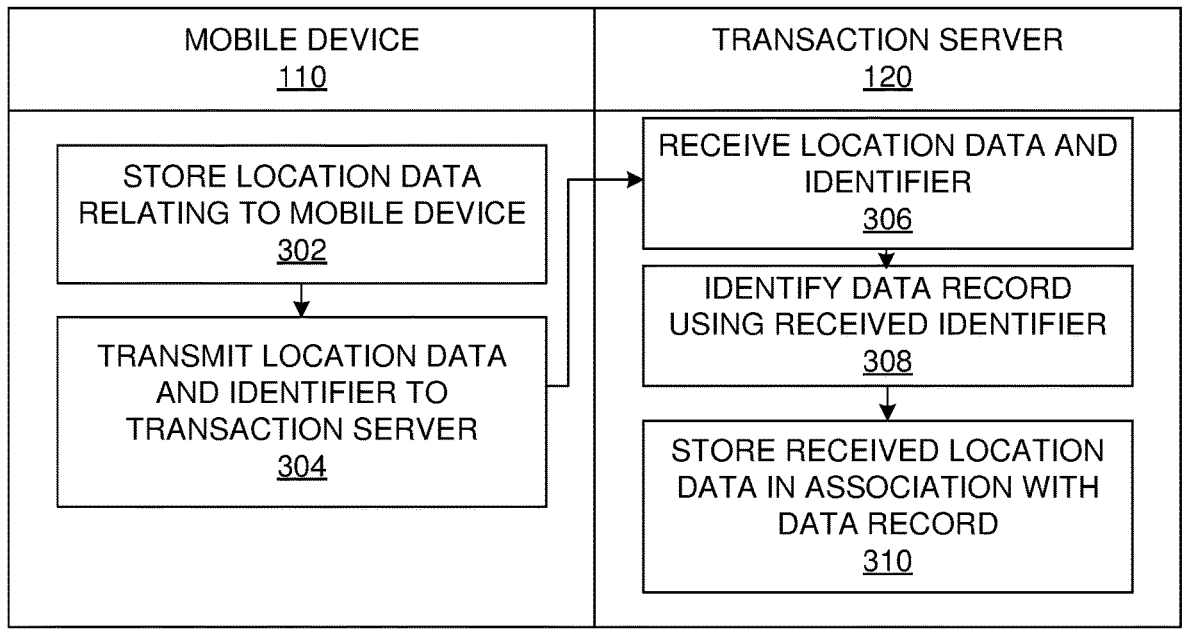
FIG. 3A is a swim-lane flow diagram which illustrates an exemplary stored location data maintenance method for identifying a mobile device requesting a secure transaction.

FIG. 3A illustrates an exemplary stored location data maintenance method (300) for identifying a mobile device requesting a secure transaction. The stored location data maintenance steps (302-310) may be repeated periodically in the background, for example during normal operation of the mobile device (110). In a first stored location data maintenance step (302), the mobile device (110) may store location data relating to the mobile device (110). The mobile device may obtain the location data from a geographical location component (e.g. a GPS receiver) of the mobile device (110) which is operable to determine the geographical location of the device.

In a following step (304), the mobile device (110) may transmit the location data relating to the mobile device and an identifier associated with the mobile device to the transaction server (120). It should however be appreciated that in another embodiment, the location data may be transmitted together with the identifier to a remote location data store.

In some cases, the mobile device may store and transmit the same location data to the transaction server so that the location data stored at the server replicates that stored at the mobile device. In other cases the mobile device may be configured to store a subset of the location data which is transmitted to the transaction server, such as a rolling window (e.g. location data for the last month, year, etc.) or a fraction of the location data transmitted to the transaction server.

The transaction server (120) may then, in a following stored data maintenance step (306), receive the location data and identifier from the mobile device (110) and, in a next step (308), identify the data record using the received identifier. The transaction server (120) may for example query a database to identify a data record associated with the identifier. In a following stored location data maintenance step (310), the transaction server (120) may store the received location data relating to the mobile device together with the identifier of the mobile device in association with the data record. The stored location data maintenance steps (302-310) may be repeated periodically. For example, the mobile device (110) may transmit location data and the identifier to the transaction server (120) every minute, hourly, daily or the like.

Owing to the unique movements of the mobile device when compared to other mobile devices, the location data relating to locations visited by that particular mobile device is usable in uniquely identifying the mobile device from other mobile devices. The historical location data stored at the mobile device is in some respect a unique fingerprint which can distinguish the mobile device from other mobile devices.

The data record may have been created by a user of the mobile device (110) at an initial registration phase. The user may have transmitted an identifier of the mobile device (110) together with other user information to the transaction server (120) for storage in association with the user's data record. In some embodiments, payment credentials of the user are stored at the transaction server (120) in association with the data record.

Figure 3B:
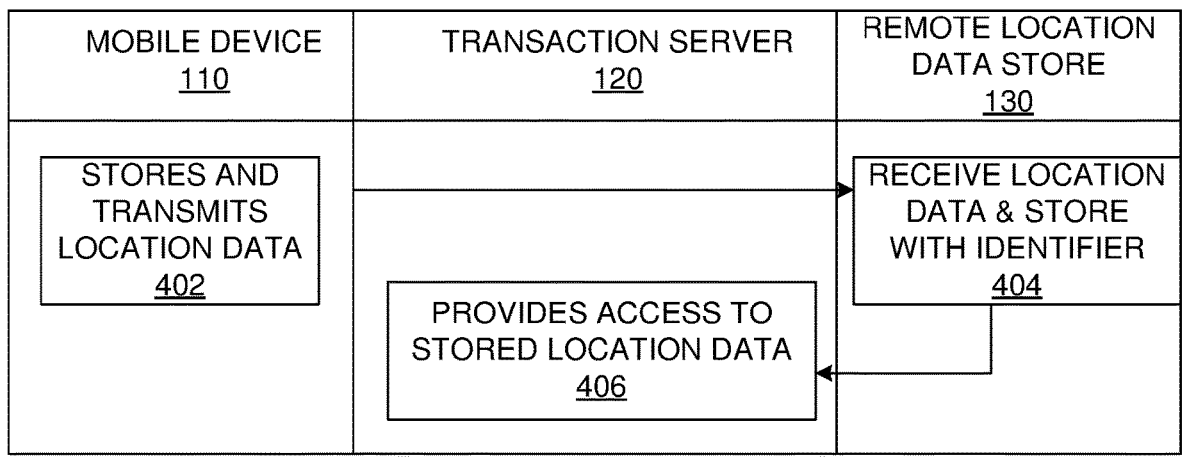
FIG. 3B is a swim-lane flow diagram which illustrates another exemplary stored location data maintenance method for identifying a mobile device requesting a secure transaction.

FIG. 3B illustrates another exemplary stored location data maintenance method (400) for identifying a mobile device requesting a secure transaction.

In an ongoing background stage (402), the mobile device (110) periodically stores location data relating to the mobile device locally thereat and transmits the location data together with an identifier of the mobile device (110) to the remote location data store (130) for storage thereat. In another embodiment, the location data may be transmitted to the transaction server (120).

The remote location data store (130) receives the location data and stores it together with the identifier at a following stage (404). The location data stored locally at the mobile device (110) may be a subset of location data that is at the remote location data store (130). Alternatively, the location data stored locally at the mobile device may be a replica of the location data stored at the remote location data store.

The remote location data store (130) and mobile device (110) thus build up a record of stored location data relating to locations visited by the mobile device. The location data may represent locations visited by the mobile device in last few hours, days, weeks, months or even years. In this respect, the location data becomes historical in that it relates to locations visited in the past, rather than 'real-time' location data.

In an ongoing stage (406), the transaction server (120) provides access to the stored location data having been periodically received relating to the mobile device (110) and stored with an identifier of the mobile device. In this embodiment, providing access to stored location data includes accessing the remote location data store (130) at which location data relating to the mobile device is stored with the identifier of the mobile device so that the transaction server (120) can use the location data stored at the remote location data store (130) to identify or verify the identity of a mobile device requesting a secure transaction. For example, the transaction server (120) may remotely access the remote location data store (130) via the internet or other appropriate communication network to enable the transaction server (120) to perform searching and matching operations on the stored location data stored at the remote location data store (130). However it should be appreciated that in another embodiment the transaction server itself may periodically receive location data relating to the mobile device together with the identifier of the mobile device and store the location data with the identifier.

Figure 4A:
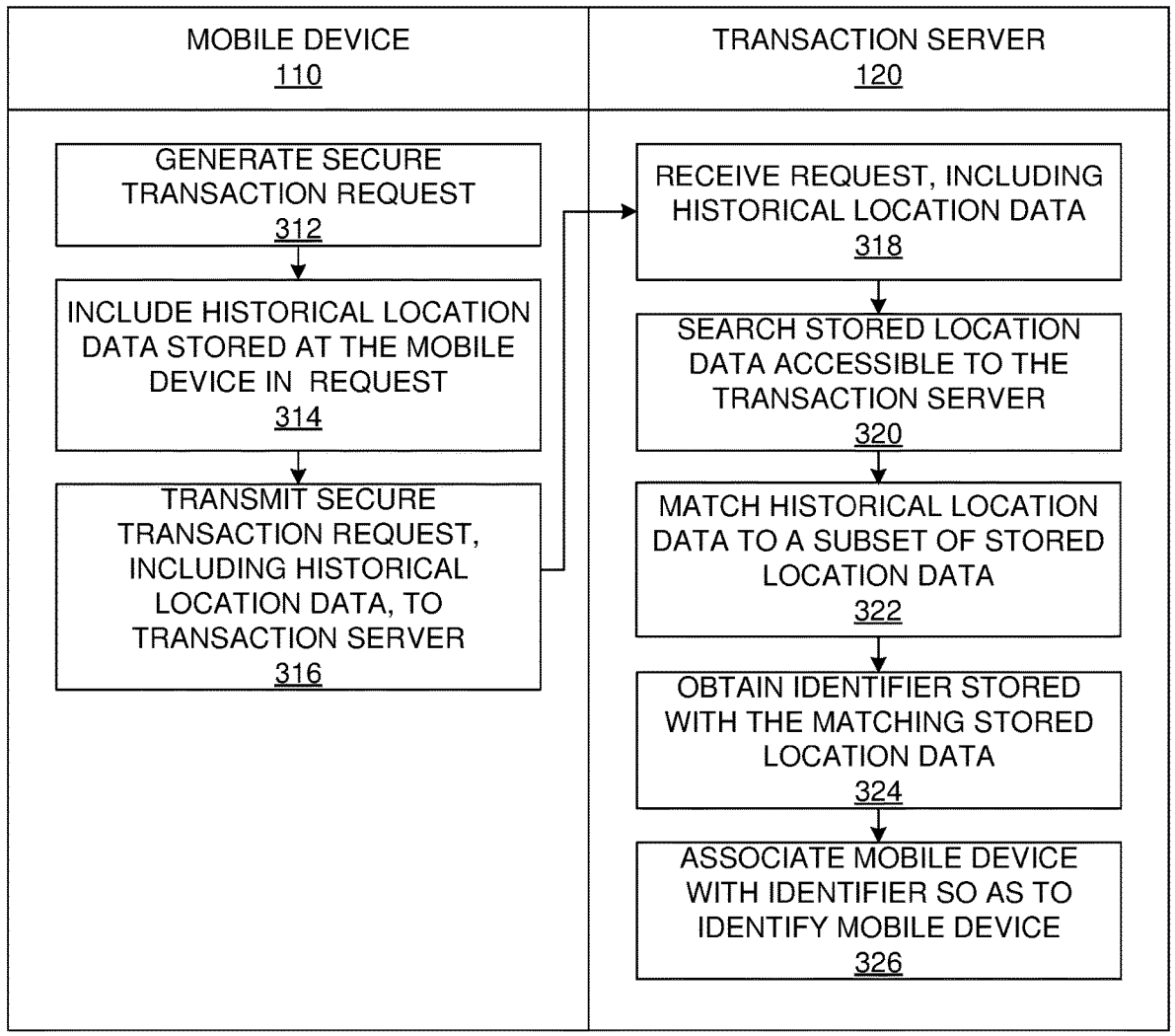
FIG. 4A is a swim-lane flow diagram which illustrates an exemplary method for identifying a mobile device when requesting a secure transaction.

At a later point, a user of the mobile device may wish to conduct a secure transaction. A secure transaction may be a request for payment credentials or a token usable in conducting a payment against the payment credentials. A secure transaction may include accessing a secure website, secure server or other resource. In some embodiments, a secure transaction may include establishing a virtual private network (VPN). In order for the transaction server (120) to process the secure transaction request against the appropriate data record, e.g. in order to provide the correct payment credentials, the transaction server must be able to uniquely identify the mobile device (110) requesting the secure transaction. FIG. 4A illustrates an exemplary method (350) for identifying a mobile device when requesting a secure transaction.

The user may input a secure transaction request into the mobile device (110) which causes the mobile device (110), in a first identification step (312), to generate a secure transaction request. In a next step (314), the mobile device (110) may include historical location data stored locally at the mobile device (110) in the secure transaction request.

The mobile device (110) may obtain one or more windows of historical location data stored locally at the mobile device. The window may for example be the last 2 hours' worth of location data stored at the device, location data collected by the mobile device in a preceding day, week or the like. In some embodiments, location data covering a span of time, for example discrete location data points stored by the mobile device over the past week may be used. In some cases, the mobile device (110) may randomly select one or more windows of the historical location data stored locally at the mobile device for transmission to the transaction server. The historical location data may also be time-stamped (e.g. have a time window associated therewith). The timestamp may, for example, be usable by the transaction server (120) in identifying a corresponding data record. For example, the timestamp may prompt the transaction server (120) to only consider location data stored thereat having a corresponding timestamp.

In a next step (316), the mobile device (110) transmits the secure transaction request, including the historical location data, to the transaction server (120). The transaction server (120) may then, in a following step (318), receive the secure transaction request including the historical location data from the mobile device (110).

At a following stage (320), the transaction server (120) searches stored location data accessible to the transaction server (120) for a subset of the stored location data which matches the received historical location data and matches the historical location data received from the mobile device to a subset of the stored location data to obtain or verify an identifier of the mobile device requesting the secure transaction at a next stage (322).

For example, the transaction server (120) may query the database using the received historical location data to identify a data record which has corresponding location data associated therewith. In some embodiments, a data record having stored location data which matches a pattern associated with the received historical location data may be identified. It is also anticipated that the transaction server (120) may use a timestamp associated with the received historical location data to identify corresponding location data.

The transaction server (120) then, at a following stage (324), obtains an identifier stored with the matching stored location data.

Once the transaction server (120) has obtained an identifier of the mobile device (110) requesting the secure transaction, the transaction server (120) may, in a following step (326) associate the mobile device (110) requesting the secure transaction with the identifier, and in turn the data record, so as to identify the mobile device (110) requesting the secure transaction.

After the mobile device requesting the secure transaction has been identified, the transaction server (120) may process the secure transaction. For example, the transaction server (120) may generate a payment token and transmit the payment token to the mobile device to enable the mobile device to conduct a financial transaction. As another example, the transaction server may grant the mobile device (110) access to a secure resource or website. The transaction server (120) may first require that the user of the mobile device authenticate him- or herself before allowing the secure transaction to be processed.

Figure 4B:
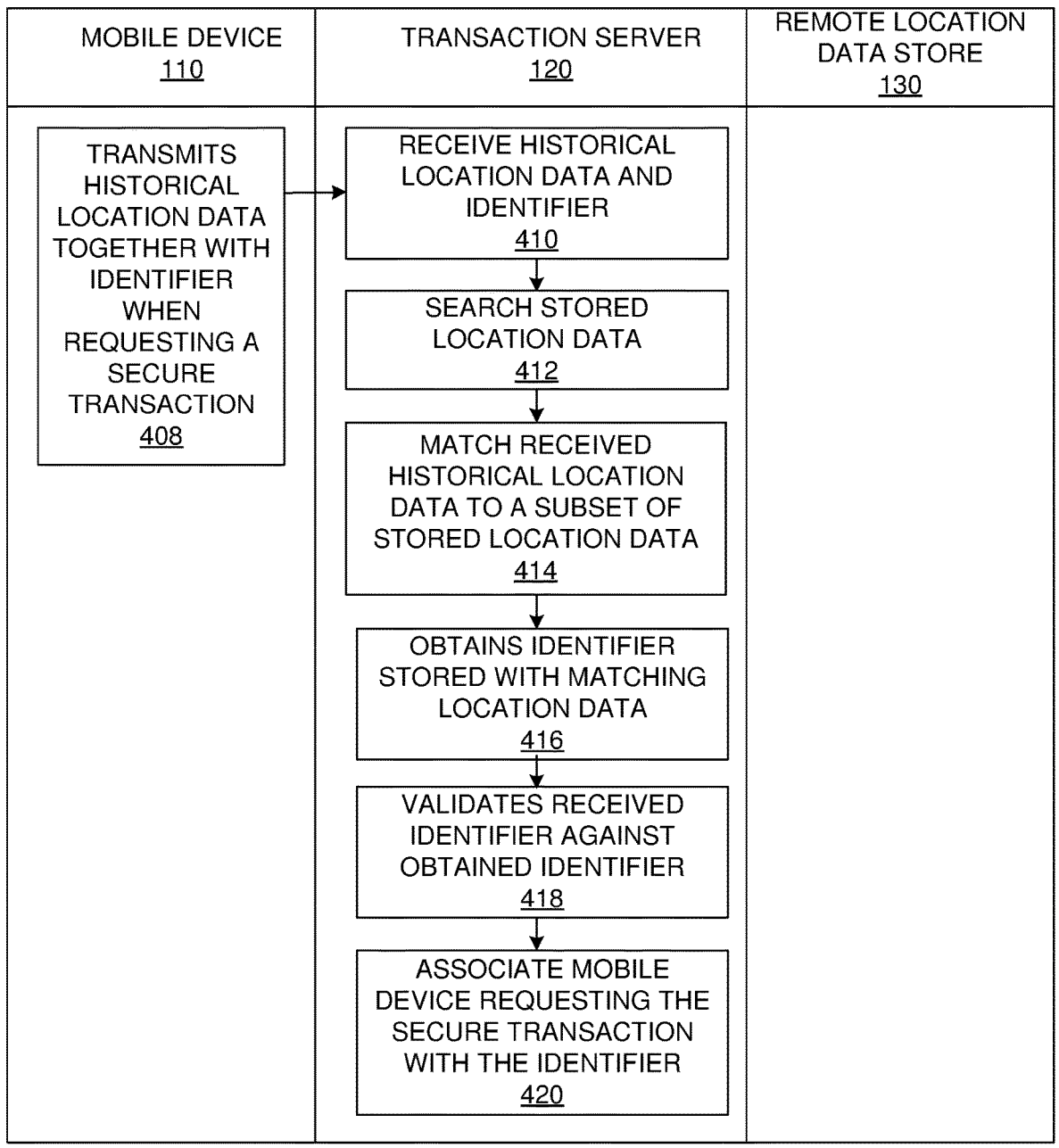
FIG. 4B is a swim-lane flow diagram which illustrates another embodiment of a method for identifying a mobile device when requesting a secure transaction.

FIG. 4B is a swim-lane flow diagram which illustrates another embodiment of a method (450) for identifying a mobile device requesting a secure transaction. In this embodiment, an identifier associated with the mobile device is transmitted from the mobile device when requesting a secure transaction together with historical location data. The transaction server is operable to verify the identifier received with the historical location data by searching stored location data accessible to the transaction server for matching location data and then verifying the received identifier against an identifier stored with the matching location data.

At an initial stage (408), when requesting a secure transaction, the mobile device (110) transmits historical location data having been stored locally thereat to the transaction server (120) for use by the transaction server in verifying the identity of the mobile device requesting the secure transaction. In this embodiment, the mobile device (110) transmits the identifier of the mobile device together with the historical location data for verification at the transaction server (120). The secure transaction request may, for example, be a request for payment credentials or a payment token usable in conducting a financial transaction.

The mobile device (110) may use an algorithm to select one or more windows of the historical location data stored locally at the mobile device for transmission to the transaction server (120). The algorithm corresponds with an algorithm executing at the transaction server (120) to determine one or more location data windows to search. The algorithm may be dynamic in that for each secure transaction request a different pattern or grouping or window of historical location data is selected. Because the algorithm is synchronised with one executing at the transaction server (120), the server will know which pattern or grouping or window of stored location data should be considered for matching purposes. The algorithm may, for example, use a random number generator to generate random windows of data or data points to select for transmission. The random number generator may use a seed value which is synchronised with a seed value stored in association with a data record at the transaction server (120). In some embodiments, the seed value may increment with each secure transaction request. In some cases, the location data may be timestamped and the algorithm may utilise the timestamps associated with the location data in selecting historical location data for transmission.

At a following stage (410), the transaction server (120) receives the historical location data from the mobile device (110) requesting the secure transaction. In this embodiment, the historical location data is received from the mobile device (110) together with the identifier of the mobile device.

The transaction server (120) then, at a next stage (412), searches stored location data, stored at the remote location data store (130) and being accessible to the transaction server (120), for a subset of the stored location data which matches the received historical location data. In this embodiment, the transaction server uses an algorithm, which corresponds with the algorithm executing at the mobile device (110), to determine one or more location data windows to search. In some cases, the location data may be timestamped and the algorithm may utilise the timestamps associated with the location data in searching for matching stored location data.

At a following stage (414), the transaction server (120) matches the historical location data received from the mobile device (110) to a subset of the stored location data to verify the identifier of the mobile device requesting the secure transaction and, at a further stage (416), obtains an identifier that is stored with the matching stored location data.

The transaction server (120) then, at a next stage (418) validates the received identifier against the obtained identifier. Validating the identifiers may include comparing the identifiers to ensure that they are the same. If the validation is successful, the transaction server (120) associates the mobile device (110) requesting the secure transaction with the identifier at a following stage (420) so as to verify the identity of the mobile device requesting the secure transaction. Associating the mobile device with the identifier may include associating the mobile device with a data record associated with the identifier and against which record a secure transaction may be processed.

It is also anticipated that the identifier received together with the historical location data may be used initially to identify an appropriate algorithm to be used to search for matching stored location data. For example, where an algorithm is specific to mobile device, the transaction server may use the identifier initially to identify a data record associated therewith and to identify the appropriate algorithm (or seed value) to use in searching for matching stored location data. If the identified algorithm identifies matching stored location data, then the mobile device requesting the secure transaction may be associated with the identifier and data record such that the requested secure transaction may be processed.

Figure 5:
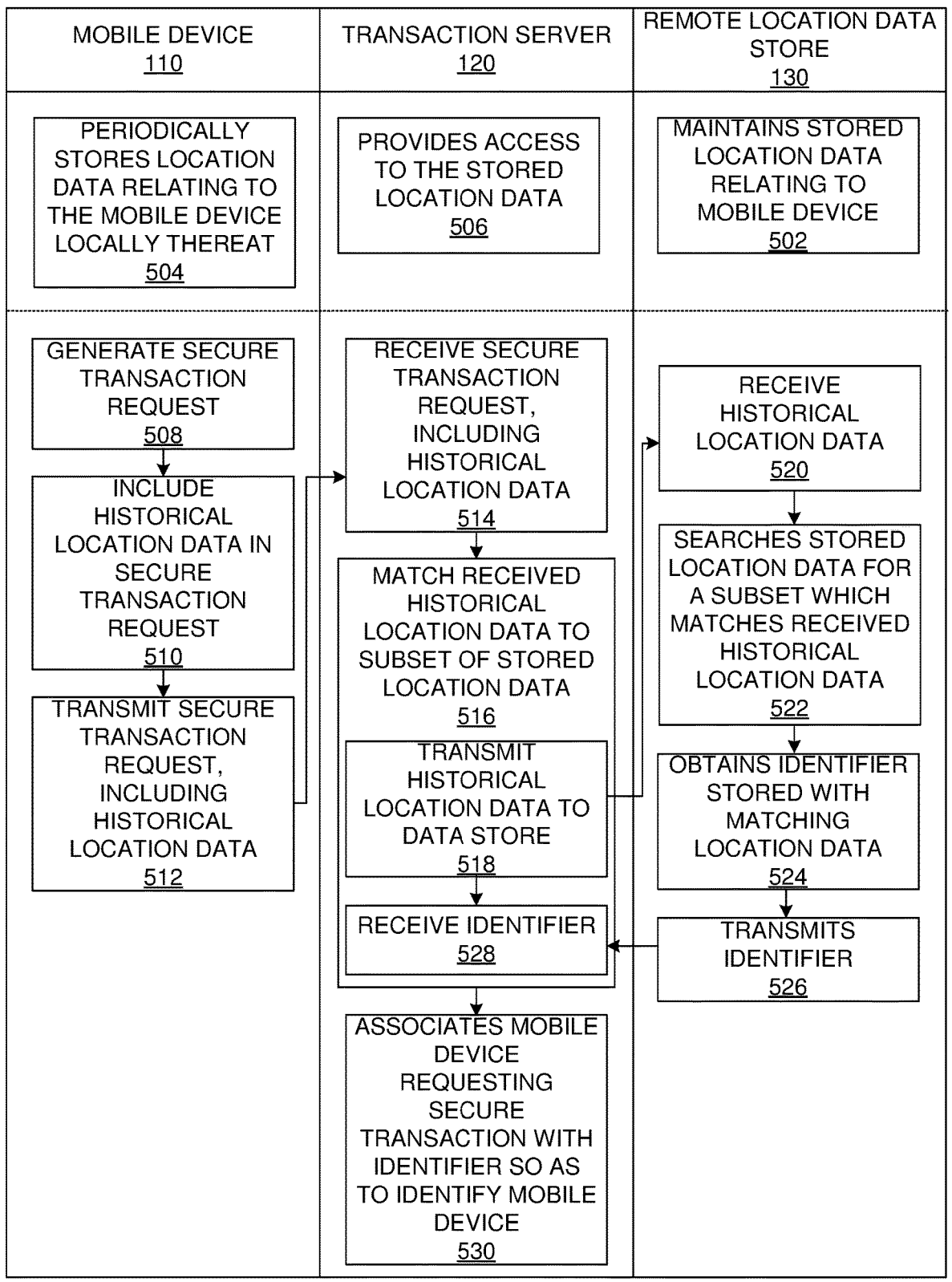
FIG. 5 is a swim-lane flow diagram which illustrates another exemplary embodiment of a method for identifying a mobile device when requesting a secure transaction.

FIG. 5 is a swim-lane flow diagram which illustrates a further exemplary embodiment of a method (500) for identifying a mobile device when requesting a secure transaction.

The transaction server (120) may have a data record stored in a database. The data record may have been created by a user of the mobile device (110) at an initial registration phase. The user may have transmitted an identifier of the mobile device (110) (e.g. a network identifier) together with other user information to the transaction server (120) for storage in association with the user's data record. In some embodiments, payment credentials of the user are stored at the transaction server (120) in association with the data record.

In this embodiment, the remote location data store (130) may be maintained or operated by a MNO and may be configured to maintain stored location data relating to the mobile device (110). For example, a mobile communication network operated by the MNO may include a number of base stations (e.g. cell towers) which provide wireless communication between the mobile device (110) and a broader communication network. The remote location data store (130) may be able to determine the geographical location of the mobile device (110) by triangulating signals from the mobile device (110) received by the base stations and may store such location data in a database in association with an identifier (e.g. a network identifier) associated with the mobile device (110). In this manner, in an ongoing stage (502) through normal operation of the mobile device (110) (e.g. making calls in the case of a smartphone), the remote location data store (130) may maintain stored location data relating to the mobile device (110). The stored location data is historical and relates to previous geographical locations of mobile device (110).

At a further ongoing stage (504), the mobile device periodically stores location data relating to the mobile device locally thereat. The mobile device may, for example, use a GPS receiver to determine its geographical location or may use signals received from the base stations to determine its geographical location (for example by triangulation and/or crowdsourcing). Owing to the fact that the stored location data maintained by the remote location data store (130) and the location data stored locally at the mobile device relate to the same geographical location of the mobile device (110), the two sets of location data should correspond to a large degree. The location data may be timestamped.

At a further stage (506), the transaction server (120) provides access to the stored location data maintained by the remote location data store (130) having been periodically received relating to a mobile device and stored with an identifier of the mobile device. In this embodiment, the transaction server (120) accesses the remote location data store (130) via a communication network such as the Internet.

At some point, a user of the mobile device may wish to conduct a secure transaction. A secure transaction may be a request for payment credentials or a token usable in conducting a payment against the payment credentials. A secure transaction may include accessing a secure website, secure server or other resource. In some embodiments, a secure transaction may include establishing a virtual private network (VPN).

The user may input a secure transaction request into the mobile device (110) which causes the mobile device (110), in a following stage (508), to generate a secure transaction request. At a further stage (510), the mobile device (110) may include historical location data having been locally stored thereat in the secure transaction request and, in a following step (512), transmits the secure transaction request, including the historical location data, to the transaction server (120). The historical location data is included in the secure transaction request to act as an 'identifier' or 'fingerprint' of the mobile device (110) to enable the transaction server (120) to uniquely identify the mobile device requesting the secure transaction. The advantage of using historical location data is that, because of the unique nature of the location data, the mobile device can relatively easily generate a unique identifier or fingerprint by simply selecting one or more subsets or windows of historical location data. Furthermore, because the mobile device's location changes with time, the fingerprint may be said to be dynamic. This may be less computationally intensive and/or may provide a higher degree of entropy than generating a dynamic fingerprint at the mobile device.

At a next stage (514), the transaction server (120) may receive the secure transaction request including the historical location data from the mobile device (110). The transaction server (120) may then, at a following stage (516), match the historical location data received from the mobile device (110) to a subset of the stored location data to obtain an identifier of the mobile device requesting the secure transaction. In this embodiment, the stage (516) of matching the location data includes a stage (518) of transmitting the received historical location data to the remote location data store (130) for searching location data stored thereat for a subset of the stored location data which matches the historical location data.

The remote location data store (130) then receives the historical location data from the transaction server (120) in a following stage (520) and, in a next stage (522) searches the stored location data for a subset of the stored location data which matches the received historical location data. Searching the stored location data may include querying a database in which the stored location data is stored using the received historical location data to identifying subsets of the stored location data which match the received historical location data. In some cases, a margin may be applied to account for inaccuracies or small discrepancies in the location data determined by the remote location data store (130) and the mobile device (110) respectively.

The remote location data store (130) then, at a following stage (524), obtains an identifier that is stored with the matching stored location data and transmits the identifier to the transaction server (120) at a following stage (526).

The transaction server (120) then receives the identifier stored with the matching stored location data from the remote location data store (130) at a following stage (528) and associates the mobile device requesting the secure transaction with the identifier so as to identify the mobile device requesting the secure transaction at a next stage (530). This may include associating the mobile device (110) with the data record associated with the identifier.

Thereafter, the transaction server (120) may process the secure transaction request against the data record. This may include using data elements stored in association with the data record. For example, the transaction server may transmit payment credentials stored in association with the data record to the mobile device, generate a single-use payment token usable against the payment credentials, grant access to a secure website, resource or the like.

The embodiments described herein are exemplary and it should be appreciated that aspects described according to one embodiment may be implemented mutatis mutandis in other embodiments.

Systems and methods for identifying a mobile device requesting a secure transaction are described herein. The systems and methods use historical location data which is built up over time to uniquely identify the mobile device. A transaction server and/or remote location data store are updated with location data relating to the geographical location of a mobile device. The location data is stored at the transaction server and/or remote location data store together with an identifier of the device. The mobile device also stores location data or at least subsets thereof. When requesting a secure transaction from the transaction server, the mobile device transmits historical location data to the transaction server to enable the transaction server to identify the device.

As the location data is continually updated on a periodic basis, it is dynamic and may change from one transaction request to another. Furthermore, algorithms may be used to dynamically select specific data points or windows of the historical location data for transmission to the transaction server when requesting a secure transaction.

In this manner the described systems and methods may be capable of providing a device identifier or device fingerprint in the form of historical location data relating to the location of the mobile device. The described systems and methods are advantageous in that they may be computationally less expensive than for example an algorithm that generates an active fingerprint. Because a large amount of historical location data may be included in a secure transaction request, the entropy or unpredictability may be high and it may be difficult for fraudsters to perform 'brute-force' attacks whereby multiple fake or synthesised identifies are tried until a match is achieved.

Figures 6, 7:
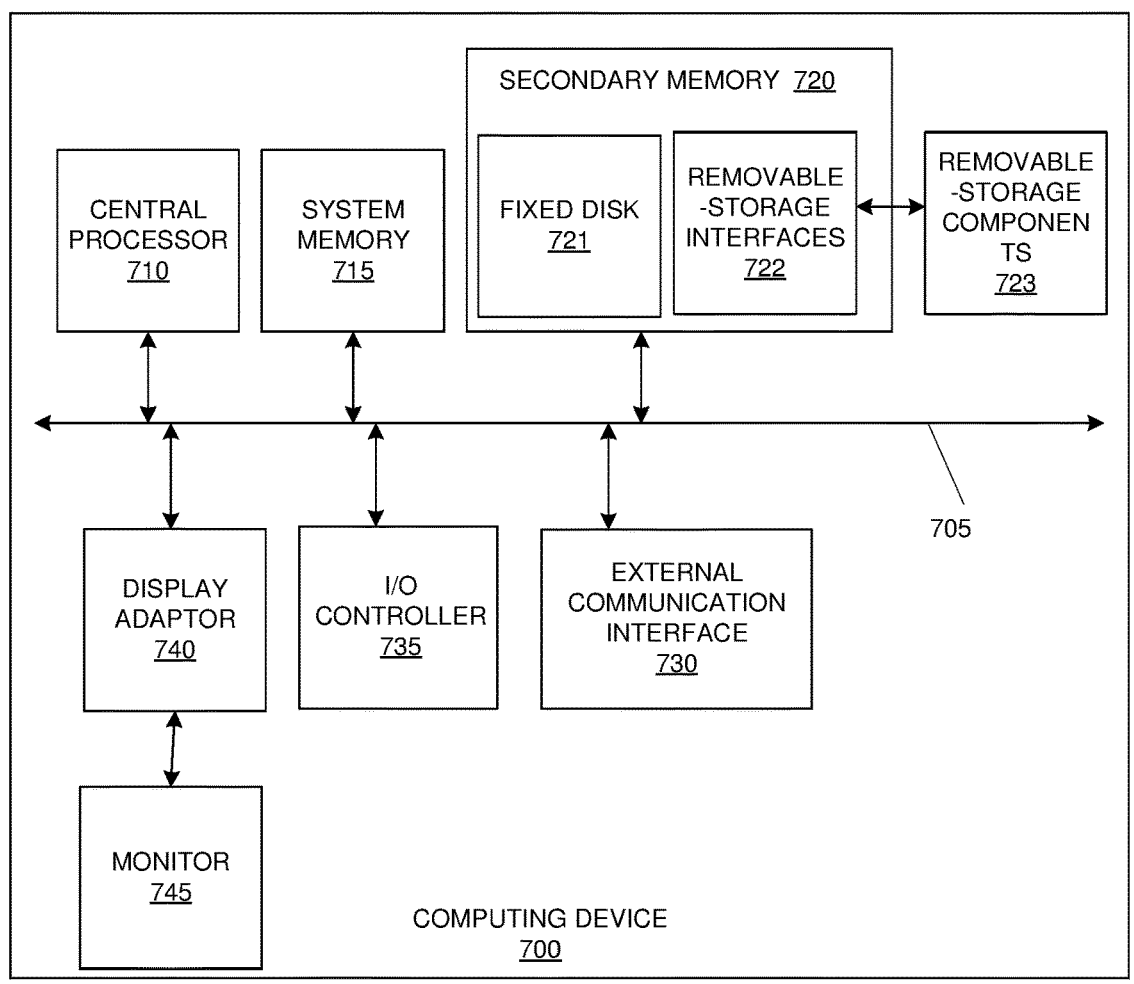
FIG. 6 illustrates an exemplary window or subset of stored location data relating to a mobile device which may be stored at a transaction server or remote location data store together with an identifier of the mobile device.
FIG. 7 illustrates an example of a computing device in which various aspects of the disclosure may be implemented; and, FIG. 8 shows a block diagram of a communication device that may be used in embodiments of the disclosure.

FIG. 6 illustrates an exemplary window or subset of stored location data (600) relating to a mobile device which may be stored at the transaction server or remote location data store together with an identifier (602) of the mobile device. In this example, the location data includes location data points (604) which are timestamped (606). Matching received historical location data to such a subset of stored location data may compare data points received in the historical location data with data points of the window. Those historical data points which match a corresponding stored data point may then be checked for a timestamp. If the timestamp of the historical data point matches the timestamp of the corresponding stored data point, then the two data points may be said to match. If all of the received historical location data points match all of the stored location data points of the window, then the identifier (602) stored with the window of stored location data may be obtained and associated with the mobile device requesting the secure transaction so as to identify the mobile device.

FIG. 7 illustrates an example of a computing device (700) in which various aspects of the disclosure may be implemented. The computing device (700) may be suitable for storing and executing computer program code. The various participants and elements in the previously described system diagrams may use any suitable number of subsystems or components of the computing device (700) to facilitate the functions described herein.

The computing device (700) may include subsystems or components interconnected via a communication infrastructure (705) (for example, a communications bus, a cross-over bar device, or a network). The computing device (700) may include at least one central processor (710) and at least one memory component in the form of computer-readable media.

The memory components may include system memory (715), which may include read only memory (ROM) and random access memory (RAM). A basic input/output system (BIOS) may be stored in ROM. System software may be stored in the system memory (715) including operating system software. The memory components may also include secondary memory (720). The secondary memory (720) may include a fixed disk (721), such as a hard disk drive, and, optionally, one or more removable-storage interfaces (722) for removable-storage components (723).

The removable-storage interfaces (722) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive. The removable-storage interfaces (722) may also be in the form of ports or sockets for interfacing with other forms of removable-storage components (723) such as a flash memory drive, external hard drive, or removable memory chip, etc.

The computing device (700) may include an external communications interface (730) for operation of the computing device (700) in a networked environment enabling transfer of data between multiple computing devices (700). Data transferred via the external communications interface (730) may be in the form of signals, which may be electronic, electromagnetic, optical, radio, or other types of signal. The external communications interface (730) may enable communication of data between the computing device (700) and other computing devices including servers and external storage facilities. Web services may be accessible by the computing device (700) via the communications interface (730).

The external communications interface (730) may also enable other forms of communication to and from the computing device (700) including, voice communication, near field communication, Bluetooth, etc. The computer-readable media in the form of the various memory components may provide storage of computer-executable instructions, data structures, program modules, and other data. A computer program product may be provided by a computer-readable medium having stored computer-readable program code executable by the central processor (710).

A computer program product may be provided by a non-transient computer-readable medium, or may be provided via a signal or other transient means via the communications interface (730). Interconnection via the communication infrastructure (705) allows a central processor (710) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (700) either directly or via an I/O controller (735). These components may be connected to the computing device (700) by any number of means known in the art, such as a serial port. One or more monitors (745) may be coupled via a display or video adapter (740) to the computing device (700).

Figure 8:
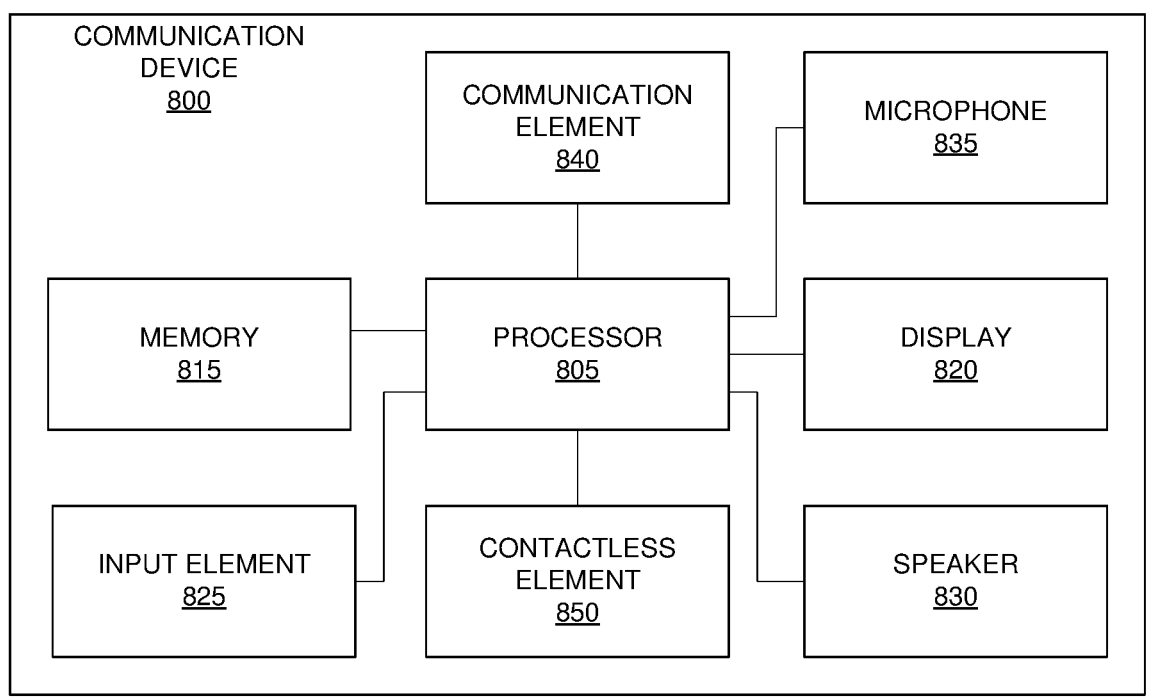

FIG. 8 shows a block diagram of a communication device (800) that may be used in embodiments of the disclosure. The communication device (800) may be a cell phone, a feature phone, a smart phone, a satellite phone, or a computing device having a phone capability.

The communication device (800) may include a processor (805) (e.g., a microprocessor) for processing the functions of the communication device (800) and a display (820) to allow a user to see the phone numbers and other information and messages. The communication device (800) may further include an input element (825) to allow a user to input information into the device (e.g., input buttons, touch screen, etc.), a speaker (830) to allow the user to hear voice communication, music, etc., and a microphone (835) to allow the user to transmit his or her voice through the communication device (800). The processor (810) of the communication device (800) may connect to a memory (815). The memory (815) may be in the form of a computer-readable medium that stores data and, optionally, computer-executable instructions.

The communication device (800) may also include a communication element (840) for connection to communication channels (e.g., a cellular telephone network, data transmission network, Wi-Fi network, satellite-phone network, Internet network, Satellite Internet Network, etc.). The communication element (840) may include an associated wireless transfer element, such as an antenna. The communication element (840) may include a subscriber identity module (SIM) in the form of an integrated circuit that stores an international mobile subscriber identity and the related key used to identify and authenticate a subscriber using the communication device (800).

One or more subscriber identity modules may be removable from the communication device (800) or embedded in the communication device (800).

The communication device (800) may further include a contactless element (850), which is typically implemented in the form of a semiconductor chip (or other data storage element) with an associated wireless transfer element, such as an antenna. The contactless element (850) may be associated with (e.g., embedded within) the communication device (800) and data or control instructions transmitted via a cellular network may be applied to the contactless element (850) by means of a contactless element interface (not shown). The contactless element interface may function to permit the exchange of data and/or control instructions between mobile device circuitry (and hence the cellular network) and the contactless element (850).

The contactless element (850) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (800) and an interrogation device. Thus, the communication device (800) may be capable of communicating and transferring data and/or control instructions via both a cellular network and near field communications capability.

The data stored in the memory (815) may include: operation data relating to the operation of the communication device (800), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (800) to selected receivers.

The communication device (800) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof. The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for identifying a mobile device associated with a request for a secure transaction, the method comprising the steps of:
    maintaining, by a transaction server, stored location data having been periodically received relating to a mobile device and stored with an identifier of the mobile device, the stored location data accessed from a remote location data store at which location data relating to the mobile device is stored with the identifier of the mobile device;
    executing, by the mobile device, an algorithm for selecting one or more windows of historical location data stored locally at the mobile device, the algorithm configured to select the one or more windows of the historical location data based on a random number generator that generates random windows of data that correspond to the selected one or more windows of the historical location data, the random number generator using a seed value;
    transmitting, by the mobile device, the one or more windows of the historical location data to the transaction server;
    receiving, from the mobile device when requesting a secure transaction, the one or more windows of the historical location data having been stored locally at the mobile device, the one or more windows of the historical location data relating to past locations of the mobile device;

matching a pattern of the one or more windows of the historical location data received from the mobile device to a pattern of a subset of the stored location data by:
  searching the stored location data accessible to the transaction server for the pattern of the subset of the stored location data that matches the pattern of the received one or more windows of the historical data; and
  obtaining an identifier stored with the subset of the stored location data having the matching pattern of the received one or more windows of the historical data, the seed value associated with the stored location data and incrementing based on each secure transaction request;

verifying an identifier of the mobile device requesting the secure transaction in response to matching the pattern of the one or more windows of the historical location data to the pattern of the subset of the stored location data by comparing the identifier of the mobile device to the identifier stored with the subset of the stored location data; and associating the mobile device requesting the secure transaction with the identifier, wherein associating the identifier with the mobile device verifies an identity of the mobile device requesting the secure transaction.

2. The method as claimed in claim 1, further comprising receiving, at the transaction server and periodically, the location data relating to the mobile device together with the identifier of the mobile device and storing the location data with the identifier, wherein the location data is received together with the identifier from the mobile device.

3. The method as claimed in claim 1, wherein the step of matching the pattern of the one or more windows of the historical location data received from the mobile device to the pattern of the subset of the stored location data includes searching the stored location data accessible to the transaction server for the pattern of the subset of the stored location data that matches the pattern of the received one or more windows of the historical location data; and verifying the identifier stored with the subset of the stored location data having the matching pattern.

4. The method as claimed in claim 1, wherein the historical location data and the stored location data is time-stamped and wherein the step of matching the pattern of the one or more windows of the historical location data received from the mobile device to the pattern of the subset of the stored location data includes searching the stored location data accessible to the transaction server for the subset of the stored location data having corresponding timestamps.

5. The method as claimed in claim 1, wherein the step of matching the pattern of the one or more windows of the historical location data received from the mobile device to the pattern of the subset of the stored location data includes transmitting the received one or more windows of the historical location data to the remote location data store for searching the location data stored thereat for the pattern of the subset of the stored location data that matches the pattern of the historical location data; and receiving, from the remote location data store, the identifier stored with the subset of the stored location data having the matching pattern.

* * * * *